United States Patent Office

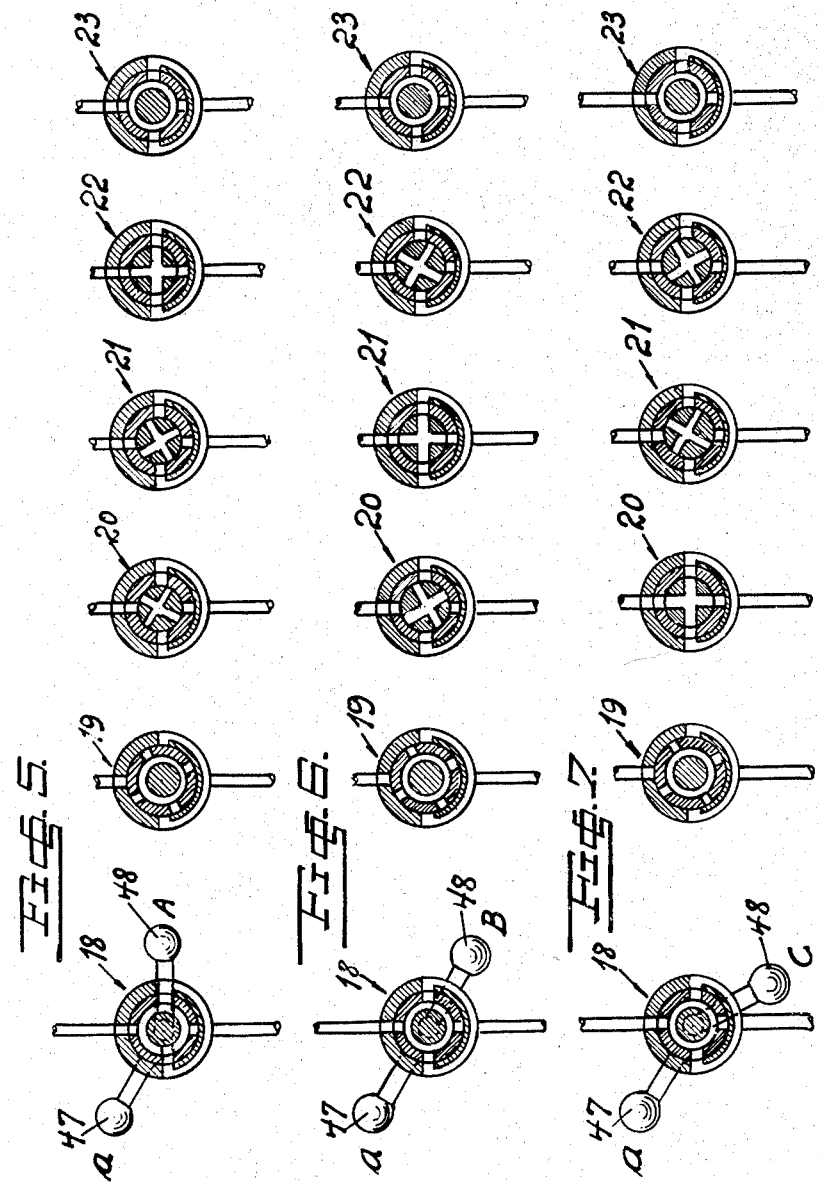

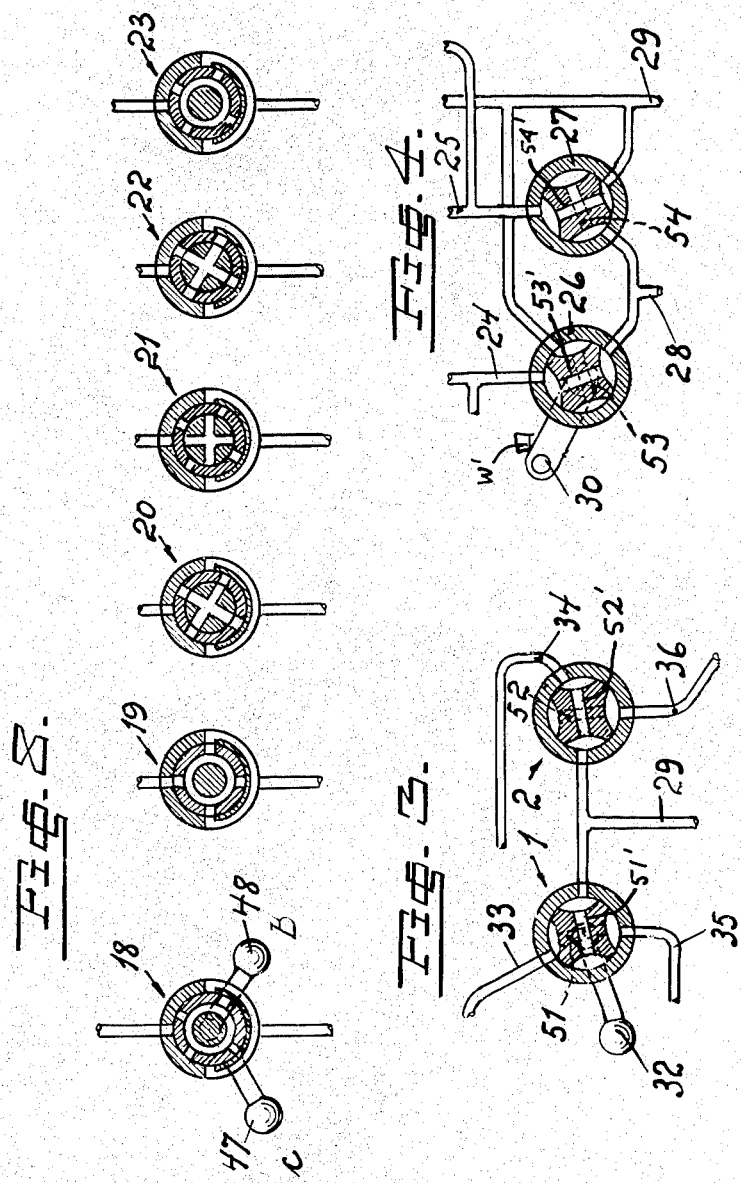

2,900,964
HYDRAULICALLY OPERATED PRE-SELECTOR FEEDING DEVICE

Hans Werner Liebmann, Karlskoga, Sweden, assignor to Aktiebolaget Johanssons Press- & Hejarverktyg, a Swedish company Application December 16, 1955, Serial No. 553,620

Claims priority, application Sweden December 23, 1954

9 Claims. (Cl. 121—45)

The present invention relates to a hydraulically operated pre-selector feeding device for effecting, selectively, the continuous or intermittent propelling of a hydraulic piston. Such pre-selector feeding devices are used, for examples, in plain grinding machines and lathes, the hydraulic piston being adapted to actuate the sliding carriage which carries the tool or the workpieces in question.

The pre-selector feeding device in accordance with the invention is characterized by a hydraulically operated control valve for the pressure medium, the valve being so arranged as to be opened and closed by impulses from the reciprocating work piece being machined.

The invention will be disclosed in more in detail hereinafter and reference will be made to the accompanying drawings, showing, as an example only, an embodiment of the pre-selector feeding device according to the invention.

Fig. 3 is a detailed schematic diagram of the manually-operated valve unit with the valves rotated to the positions illustrated by the phantom line in Fig. 1;

Fig. 4 is a detailed schematic diagram of the reversing valves rotated to the position shown by the phantom lines in Fig. 1;

Figs. 5–8 illustrate diagrammatically the various positions of the stop valves for the various positions of the valve slides of the cylindrical valve.

Figure 1:
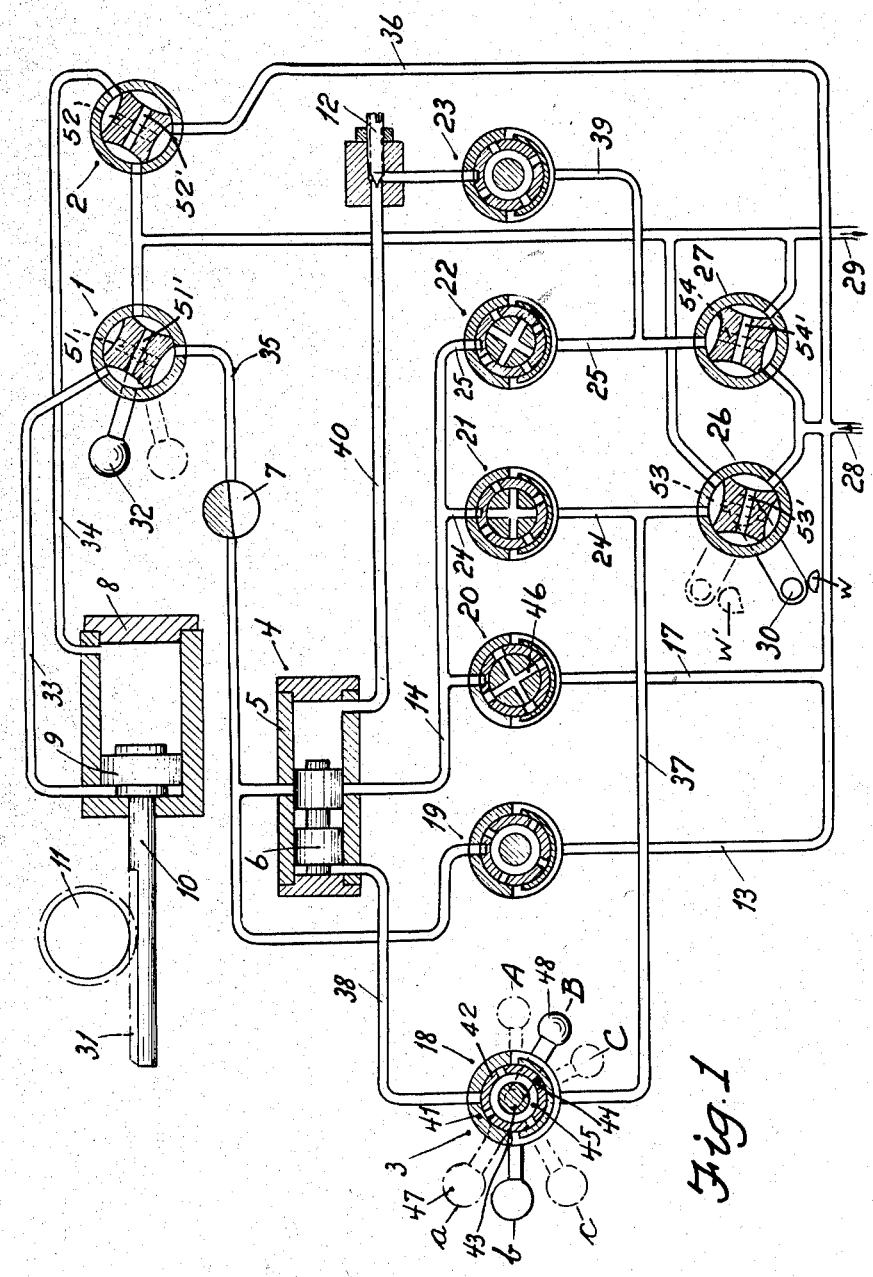
Fig. 1 is a schematic diagram of the hydraulic system for my pre-selector feeding device.

By the arrangement shown in the drawing, 9 designates a piston, shiftable in a cylinder 8. The piston is provided with a rod 10 furnished with teeth 31 meshing with a gear wheel 11 which is adapted to move the sliding carriage of a tool machine, for example a grinding machine, or of a workpiece, not shown on the drawing. Pressure medium is supplied by a conduit 28 connected with a pressure medium source, and return medium is discharged through the conduit 29. Two manually-operated direction-controlling valves, 1 and 2 respectively, are situated in the pressure medium operating conduit to cylinder 8 and coupled to each other, forming a unit. These valves can be shifted by a lever 32 and by means of them pressure medium can be conducted either through conduits 36 and 34 to one side of piston 9 or through conduits 35 and 33 to the opposite side of said piston 9. Conduits 36 and 34 are only used in case one should wish to move piston 9 back to its initial position, that is that position shown on the drawing.

When piston 9 is to be propelled, the pressure medium is supplied through a system of valves making it possible either to move piston 9 a little distance at one or both reversing points of the reciprocating work piece under machining, or to move the piston continuously. Said valve system is arranged in the following way. The pressure medium supply conduit to cylinder 8 is provided with a hydraulically operated control valve, generally designated 4, consisting of a spool 6, slidably movable in a cylinder 5. In the position shown on the drawing, spool 6 blocks the connection between conduits 14 and 35 and pressure medium can not be supplied to cylinder 8. If the spool 6 is shifted to its righthand position, communication between conduits 14 and 35 will be established for a moment, that is when the center space between the lands of spool 6 passes the ports of conduits 14 and 35 in cylinder 5. Piston 9 will accordingly be moved a certain distance depending on the quantity of pressure medium which will pass through during the shifting of spool 6. This quantity depends partly on the rate of travel of spool 6, and partly on the flow resistance of the conduits whereby the resistance can be adjusted by a throttle valve 7 embodied in conduit 35. The operating conduit 39—40 to cylinder 5 is provided with a throttle valve 12, by means of which the rate of spool 6 can be adjusted, and also two stop valves, 18 and 23 respectively, by means of which the supply of pressure medium to cylinder 5 can be cut off completely in case continuous feeding or no feeding at all is desired. Valves 18 and 23 are mounted in a multiple valve mechanism (see Fig. 2), which will be described more in detail further on.

The pressure medium supply conduit to cylinder 8 is also provided with two reversing valves, 26 and 27 respectively, connected in parallel and forming a unit. They can be shifted by means of a lever 30 which is engaged by the reciprocating workpiece when the latter reaches its limit positions (schematically shown by the reference characters W, W' in the drawing).

The parallel conduits 24 and 25, embodying reversing valves 26 and 27, are also provided with stop valves, 21 and 22 respectively. These are mounted in the multiple valve mechanism, mentioned before, and so adapted that blocking one causes venting of the other and vice versa. The pressure medium operating conduits 37, 39 to cylinder 5 connect with the parallel conduits 24 and 25, respectively, at a point situated between each reversing valve and the stop valve, connected in series with said reversing valve. Hence, reversing valves 26, 27 will on one hand conduct the supply of operating medium to cylinder 5 and on the other control the supply of pressure medium to cylinder 8 in conjunction with stop valves 21 and 22, causing pressure medium to be delivered to cylinder 8 only when the work piece is at one of its reversing points.

A pressure medium conduit 17 is arranged to by-pass the reversing valves 26, 27 and the stop valves 21, 22, allowing the source of pressure medium to be connected directly with conduit 14. Conduit 17 is provided with a valve 20, which is also mounted in the before mentioned multiple valve mechanism. When valve 20 is open, conduit 14 will constantly be under pressure and thus a quantity of pressure medium will pass from conduit 14 to conduit 35 every time spool 6 shifts, i.e. every time valves 26, 27 are reversed. Consequently a feeding movement will take place every time the work piece reaches one of its reversing points.

A pressure medium conduit 13 is arranged to by-pass the reversing valves 26, 27, the stop valves 21, 22 and the hydraulically controlled valve 4, allowing the source of pressure medium to be connected directly with conduit 35. Conduit 13 is provided with a valve 19, which is also mounted in the before mentioned multiple valve mechanism (Fig. 2) and so adapted that when valve 19 is open all other valves included in the multiple valve are blocked. In this case pressure medium will constantly be fed into cylinder 8 resulting a continuous feeding movement of piston 9.

As already mentioned in the foregoing discussion, valves 18—23 are assembled to a multiple valve mechanism (Fig. 2), on the drawing generally designated 3.

This multiple valve comprises a cylindrical valve casing 41 with two valve slides embodied therein, viz. firstly an outer tubular slide 42 and secondly an inner cylinder slide 43. Slide 42 is adapted to be rotated in the valve bore of the casing by means of a lever 47, and the inner slide 43 is adapted to be rotated in the outer slide by means of a lever 48. The outer slide is provided with ports 44 at points corresponding to the different component valves 18—23. The inner slide 43 is provided with annular grooves 45 at points corresponding to the component valves 18, 19 and 23. In addition inner slide 43 is provided with radial bores 46 at points corresponding to the component valves 20—22.

The outer slide 42 is so arranged as to be set in three different positions, indicated on the drawing by the three positions a, b and c of lever 47. When the outer slide has its position a, the inner slide 43 is so arranged as to occupy three different positions, indicated on the drawing by the three positions A, B and C of lever 48 (see Figs. 5–7). As illustrated by the drawing, one and all of valves 18—23 are blocked when lever 47 takes its position b. The position of lever 48 makes no difference in this case and no feeding whatsoever of piston 9 will take place. If lever 47 occupies position c, among valves 18—23 only valve 19 will be open (Fig. 8). This means that piston 9 is continuously fed. The position of inner slide 43 is indifferent.

If lever 47 occupies position a, piston 9 will be fed step by step, that is the pressure medium must pass through valve 4 on its way to cylinder 8. If in this case lever 48 occupies position A, pressure medium intended for cylinder 8 can only pass through valve 21, which means that piston 9 will only be moved when the work piece has reached one of its reversing points, e.g. the left one. If lever 48 occupies position C, pressure medium intended for cylinder 8 can only pass through valve 22, which means that piston 9 will only be moved when the working piece has reached its other reversing point, hence in this case the right one. If, finally, lever 48 occupies position B, valve 20 will be open. Conduit 14 will therefore constantly be under pressure which causes piston 9 to be fed at both reversing points of the work piece.

Figure 3 illustrates valve units 1 and 2 in the position indicated in broken lines in Fig. 1. In Fig. 1 flow has taken place from 36 to 34 through the passage 52 of valve 2. When piston 9 has reached its left-hand position, lever 32 is turned to the position shown in Fig. 3, and liquid may then flow from 35 to 33 through the passage 51 of valve 1, whereas the passage between 36 and 34 is blocked.

Fig. 4 shows valve units 26 and 27. In Fig. 1 supply conduit 28 is blocked by valve 26, but is in connection with conduits 25 and 39 through the passage 54 of valve 27. In Fig. 4, liquid flows from 28 to 24 through the passage 53' of valve 26, and from 25 to 29 through the passage 54 of valve 27.

Figure 2:
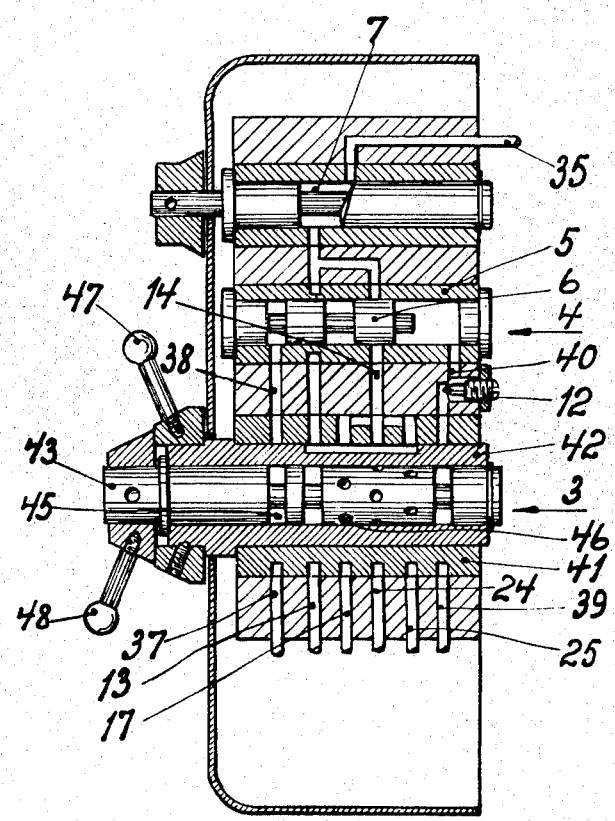
Fig. 2 is a partly sectioned longitudinal elevational view of the operating valve.

Fig. 5 shows valves 18—23 (which are in fact combined into one unit as shown in Fig. 2) with lever 47 in position "a" and lever 48 in position "A." Valves 18, 22 and 23 are open, valves 19, 20 and 21 are closed. This means that feeding of piston 9 will take place only in one position of the workpiece W. Imagine for instance that workpiece W turns lever 30 from the position shown in Fig. 1 to the position shown in Fig. 4. Pressure liquid will now flow from inlet 28 through valve 26, conduit 37, valve 18 and conduit 38 and push piston 6 into its right-hand position.

No liquid will flow to motor 8—9 during this operation, because valves 19, 20 and 21 are closed, and the open valve 22 is cut off from inlet 28 by means of valve 27. Consequently, no feeding of piston 9 will take place. When the workpiece W has reached its other end position, it turns lever 30 back into the position shown in Fig. 1. Liquid from inlet 28 will now penetrate two ways, one way through valve 27, conduit 39, valve 23, throttle 12 and conduit 40, so as to force piston 6 into its left-hand position, the other way through valve 27, conduit 25, valve 22, conduits 14 and 35, valve 1 (open through passage 51, see Fig. 3) and conduit 33 so as to force piston 9 to the right. Conduits 14 and 35 are connected only during the short time when piston 6 is in its middle position. Consequently, piston 9 will be displaced a short distance to the right.

Fig. 6 shows lever 47 in position "a" and lever 48 in position "B." Valves 18, 21 and 23 are open, valves 19, 20 and 22 are closed. This will result in a feeding motion of piston 9 when workpiece W is in its other end position W', i.e. when the workpiece moves lever 30 from the position shown in Fig. 1 into the position shown in Fig. 4.

Fig. 7 shows lever 47 in position "a" and lever 48 in position "C." Valves 18, 20 and 23 are open, valves 19, 21 and 22 are closed. This means that liquid can always pass through valve 20, independent on the situation of valves 26 and 27. This means that liquid will reach motor 9—10 both when piston 6 moves to the right and when it moves to the left, i.e. both when lever 30 is in the position shown in Fig. 1 and in the position shown in Fig. 4. Consequently, piston 9 will be displaced a little distance to the right in both end positions of the workpiece W.

Fig. 8 shows lever 47 in position "C" and lever 48 in position "B." The position of lever 48 is immaterial. The fact that lever 47 is in position "C" means that only valve 19 is open, valves 18, 20, 21, 22 and 23 are closed. The only way which is open for the liquid is through conduit 13, valve 19, conduit 35, valve 1 and conduit 33 into motor 9—10. Consequently, piston 9 will be fed to the right with a continuous motion, independent of the position of the workpiece W.

Finally, it is to be pointed out that Fig. 1 shows lever 47 in position "b" (after having been corrected). This means that all valves 18—23 are closed, and no feeding is taking place. In Fig. 1 liquid flows from 28 through 36, 2, and 34 and moves piston 9 to its left-hand position, from which another feeding operation can take place.

What I claim is:

1. The combination with a reciprocatable element such as a machine table and a double-acting hydraulic motor connected to said element for reciprocating the same, a source of pressure fluid, a pressure duct for conveying pressure fluid from said source to said motor, and a return duct for conveying pressure fluid from said motor; of a hydraulically-operated control valve having an inlet and an outlet connected in series in the pressure fluid duct of said hydraulic motor, said control valve having a valve member therein controlling the passage of fluid through said valve, a reversing valve unit including a pair of reversing valves connected in parallel in said pressure fluid duct intermediate the pressure source and said control valve, said reversing valve unit being operated by said reciprocatable element when said element reaches an end position during its movment, each of said reversing valves having a stop valve connected in series therewith intermediate said reversing valves and said control valve, and actuating duct means for controlling the operation of said control valve member comprising a pair of actuating ducts each connected at one end to said control valve and at the other end respectively to a branch of said pressure duct intermediate one of said reversing valves and its associated stop valve.

2. A device as defined in claim 1 wherein each actuating duct includes at least one stop valve.

3. A device as defined in claim 1 and further including a throttling valve in one of said actuating ducts for adjusting the shifting rate of the hydraulically-operated control valve member.

4. A device as defined in claim 2 and further including a by-pass conduit having a stop valve, one end of said by-pass conduit being connected to the inlet side of said control valve and the other end being so connected to the pressure duct as to by-pass said reversing valves.

5. A device as defined in claim 2 and further including a by-pass conduit provided with a stop-valve, said by-pass conduit being connected at one end to the outlet of said control valve and being so connected at the other end to said pressure duct as to by-pass said reversing valves and said control valve.

6. The combination with a reciprocatable element such as a machine table and a double-acting hydraulic motor connected to said element for reciprocating the same, a source of pressure fluid, a pressure duct for conveying pressure fluid from said source to said motor, and a return duct for conveying presure fluid from said motor; of a hydraulically-operated control valve having an inlet and an outlet connected in series in the pressure fluid duct of said hydraulic motor, said control valve having a valve member therein controlling the passage of fluid through said valve, a reversing valve unit including a pair of reversing valves connected in said pressure fluid duct intermediate the presure source and said control valve, said reversing valve unit being operated by said reciprocatable element when said element reaches an end position during its movement to cause one of said reversing valves to be opened and the other of said reversing valves to be closed with respect to said pressure fluid source, a first stop valve connected in series with one of said reversing valves intermediate said control valve and said one reversing valve, a second stop valve connected in series with the other of said reversing valves intermediate said control valve and said other reversing valve, actuating duct means for controlling the operation of said control valve member comprising a pair of actuating ducts each connected at one end to said control valve and at the other end respectively to a branch of said pressure duct intermediate one of said reversing valves and its associated stop valve, one of said actuating ducts including a third stop valve and the other of said actuating ducts including a fourth stop valve, and means for selectively closing one of said first and second stop valves and opening of the others of said stop valves to cause operation of said hydraulic motor when said reciprocatable element reaches an end position.

7. Apparatus as defined in claim 6 and further including a first by-pass conduit having a fifth stop valve, one end of said by-pass conduit being connected to the inlet side of said control valve and the other end being connected to the pressure duct to by-pass said reversing valves, and means for closing said first and second stop valves and for opening said third, fourth and fifth stop valves to cause operation of said hydraulic motor when said reciprocatable element reaches either end position.

8. Apparatus as defined in claim 7, and further including a second by-pass conduit provided with a sixth stop valve, said by-pass conduit being connected at one end to the outlet of said control valve and at the other end to said pressure duct to by-pass said reversing valves and said control valve, and means for opening said sixth stop valve and for closing all of said other stop valves to cause continuous operation of said hydraulic motor.

9. Apparatus as defined in claim 6 and further including a throttle valve in one of said actuating ducts for adjusting the shifting rate of the hydraulically-operated control valve member.

References Cited in the file of this patent
UNITED STATES PATENTS

| | | |
|---|---|---|
| 2,235,085 | Roehm | Mar. 18, 1941 |
| 2,496,756 | Seborg | Feb. 7, 1950 |
| 2,758,570 | Liebmann | Aug. 14, 1956 |
| 2,798,460 | Mathys | July 9, 1957 |
| 2,840,956 | Grinage | July 1, 1958 |